United States Patent

[11] 3,593,853

| [72] | Inventor | Hermann Koethke |
| | | Hagen, Germany |
| [21] | Appl. No. | 853,024 |
| [22] | Filed | Aug. 26, 1969 |
| [45] | Patented | July 20, 1971 |
| [73] | Assignee | H. Putsch & Company |
| [32] | Priority | Aug. 26, 1968 |
| [33] | | Germany |
| [31] | | P 17 86 168.6 |

[54] INCLINED FILTER ASSEMBLY
6 Claims, 5 Drawing Figs.

[52] U.S. Cl. .................................... 210/330,
210/332, 210/344
[51] Int. Cl. .................................... B01d 29/34,
B01d 29/02
[50] Field of Search ...................... 210/330,
331, 332, 344, 345, 241

[56] References Cited
UNITED STATES PATENTS

| 2,696,916 | 12/1954 | Peterson et al. | 210/331 X |
| 3,064,817 | 11/1962 | Van Der Werff | 210/331 X |
| 3,137,652 | 6/1964 | Graue | 210/344 X |
| 3,195,729 | 7/1965 | Kracklauer et al. | 210/344 X |
| 3,441,141 | 4/1969 | Zimmermann et al. | 210/241 |
| 3,494,467 | 2/1970 | Paisley et al. | 210/344 X |

*Primary Examiner*—Frank A. Spear, Jr.
*Attorney*—Waters, Roditi, Schwartz and Nissen

ABSTRACT: A disc-type filter comprises discs set on a shaft which is inclined to the horizontal. The discs are set obliquely on the shaft.

PATENTED JUL 20 1971 3,593,853

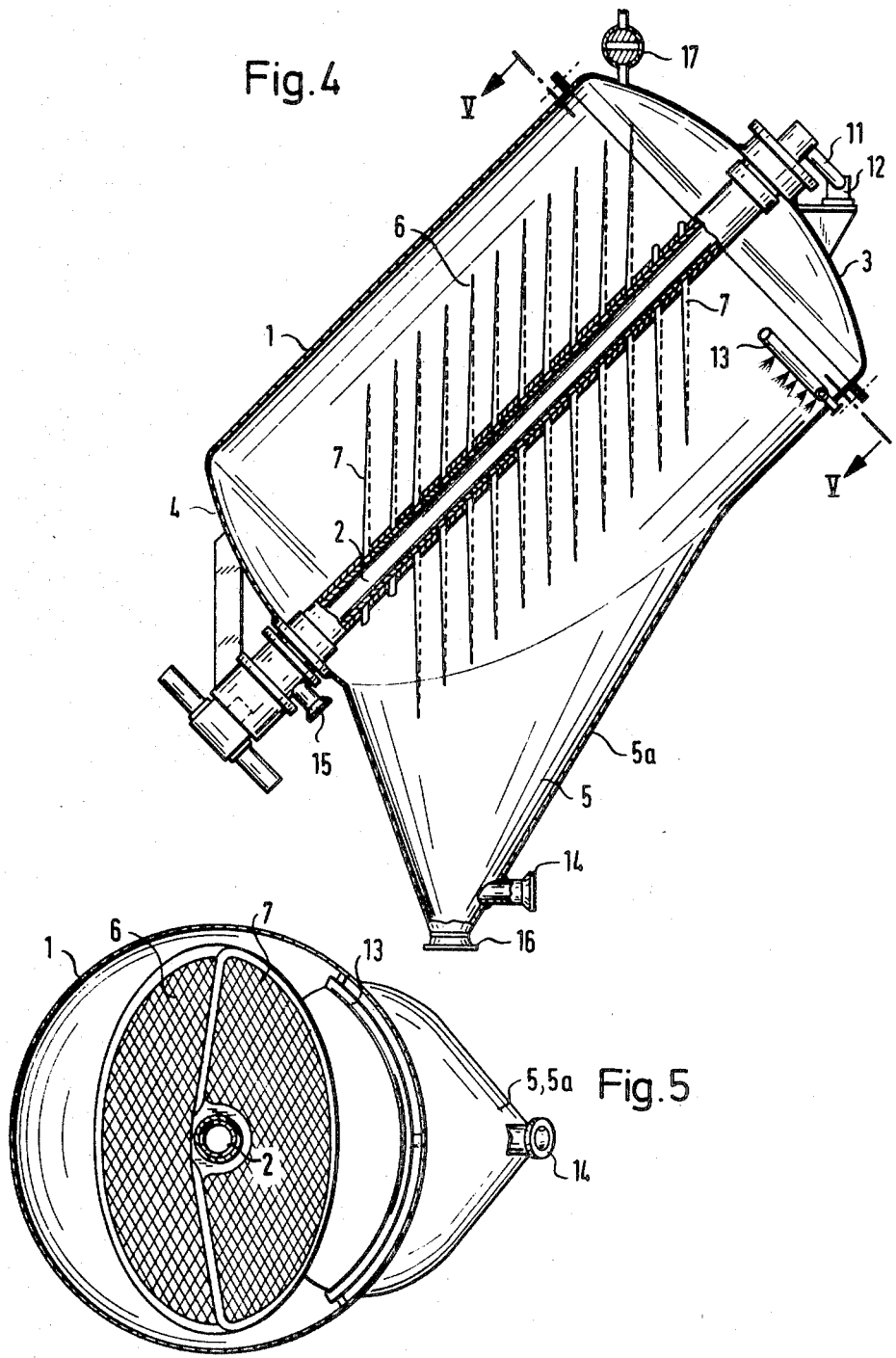

INCLINED FILTER ASSEMBLY

The present invention relates to filters of the disc-type. Known forms of such filters comprise discs arranged on a rotary shaft one about the other. The discs are circular and their operational position substantially horizontal.

Filters of this type are designed more particularly for use with a filter aid which is suspended in the liquid and sucked onto the filtering discs made of filtering material. Such layers can be formed by filtering aids such as suspended kieselguhr. The suspended kieselguhr is brought into the housing of the filter and caused to be deposited on the horizontal filter elements in the form of a filter aid layer. After the end of the deposit of the filter aid, liquid with any remaining suspended filter aid is discharged from the filter housing and filtration proper can begin. For this the suspension to be filtered is pumped into the housing and the suspended particles are deposited as a filter cake on the layer of filter aid on the discs.

Owing to the horizontal arrangement of the filter discs such filters have the advantage that they are not sensitive to variations in pressure so that even interruptions in the pressure applied are permissible during the filtering procedure. Furthermore, the filter cake formed on the filter discs cannot fall from the filter discs owing to the particular spatial arrangement of the discs, when suspension to be filtered is discharged from the filter housing.

The disadvantage of previously known disc filters which generally have a vertical shaft with filter discs arranged one above the other on it has been in the difficulty of removing the filter cake after the termination of filtration. For this purpose it has been the practice to set the shaft of the disc in relatively rapid rotation so that the filter cake is thrown off the horizontal discs by centrifugal force. This, however, makes necessary a relatively robust construction since, on the one hand, a comparatively large weight must be accelerated and, on the other hand, substantial annular velocities are necessary in order to throw parts of the filter cake near the shaft on the discs outwards. In order to overcome these difficulties in removing the filter cake a proposal has already been made to cause the filter discs to move backwards and forwards about the shaft carrying them. This, however, involves the transmission of very high dynamic forces to the container as a whole. One aim of the present invention is to provide a disc filter which is free of the above-mentioned disadvantages and while having a very compact but light construction provides for simple removal of the filter cake after the termination of filtration.

The present invention consists in a filter comprising a container, shaft and liquid duct means extending into the container and arranged for rotation in it, hollow filter disc means which are mounted on the shaft and duct means for rotation with it, and connected hydraulically with the shaft and duct means for the drawing of liquid into the disc means, the disc means being set obliquely on the shaft and the shaft being set at an angle to the vertical. For example the shaft means can be set at an angle of 45° to the vertical and the disc means can be set at an angle of 45° to the shaft.

By turning the shaft and duct means carrying the filter disc means through about 180° the filter disc means can be moved from an approximately horizontal position into a vertical or almost vertical position in which the filter cake can easily slide off under its own weight and can slide down the inclined container wall as far as the bottom of the housing where there is a filter cake collection space. It is not always necessary during the deposit of the filter aid and the filtration process proper to hold the filtering faces of the filter disc means precisely horizontal. In the cleaning position a certain departure from a vertical position is in most cases not disadvantageous.

A particular advantage of the disc filter in accordance with the invention is that no dynamic forces act on the filter disc means so that the individual elements of the construction can be made with a comparatively low strength. Furthermore, the diameter of the housing only has to be slightly greater than the diameter of the circular filter disc means. In such a construction it is found that a section in the plane of the vertically extending plates or filter disc means and passing through the cylindrical container is elliptical and its minor axis is only slightly greater than the diameter of the filter elements while its major axis in the case of an oblique setting of the filter container at about 45° is about 1.4 times the minor axis. This means that between the bottom edge of the filter disc means and the container wall there is a distance amounting to about 40 percent of the container radius so that the filtered-off sludge can readily slide without hinderance between the filter disc means to the bottom of the container.

The removal of the filter cake can be carried out in a known manner by reverse flow of a liquid or gaseous medium, something which would have no or little effect in the case of centrifuging filter cakes from horizontally placed filter discs because in this case the rotary movement of the filter disc means cannot be satisfactorily transmitted to the filter cakes when they are raised from their support.

In accordance with the nature of the filter cake removal can be aided by arranging an arm on the shaft means so as to abut against a stop so as to provide a shaking or jerking which facilitates removal of the filter cake from its support.

There is also the possibility of providing a sludge trough which is steeper than the shaft means, for example with an angle of 30° from the vertical, so that the sliding of the detached filter cake can be aided. Sludge which adheres to the inner surfaces can be washed down by a swilling device. In the case of a filter construction in accordance with the invention it is not necessary to swill the whole container but only the bottom part of its interior.

Further details of the invention will now be explained with reference to embodiments of the invention, reference being had to the accompanying drawings.

FIG. 4 is a vertical section of a second embodiment showing filter discs in the cleaning position FIG. 5 is a section along the line V–V of FIG. 4.

Figure 1:
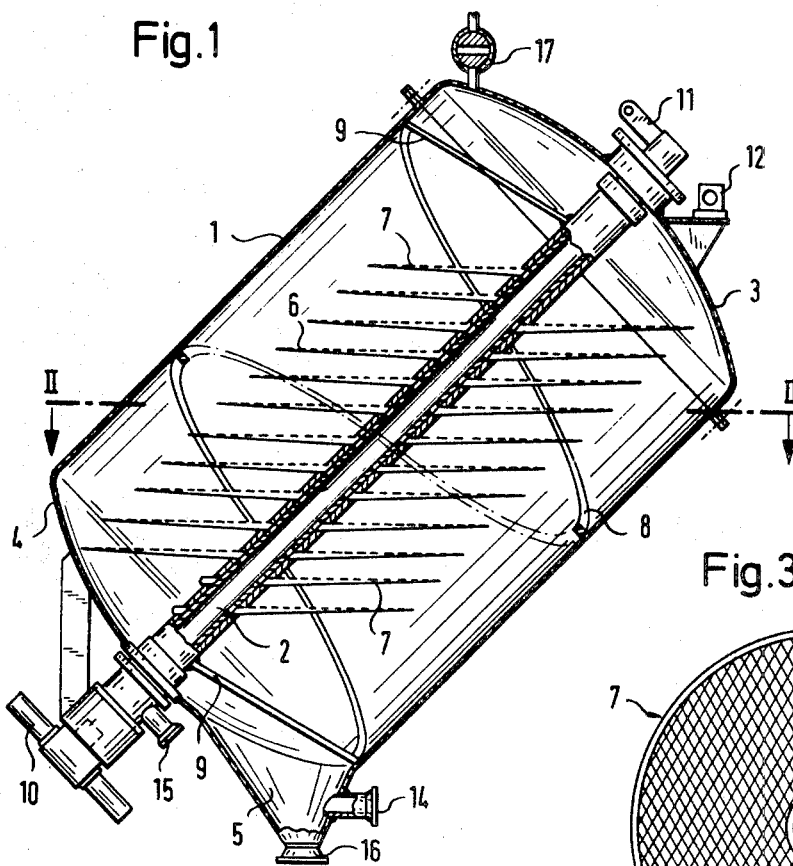
FIG. 1 is a vertical section of a first embodiment of the invention showing the filter discs in the filtration position.
Figure 3:
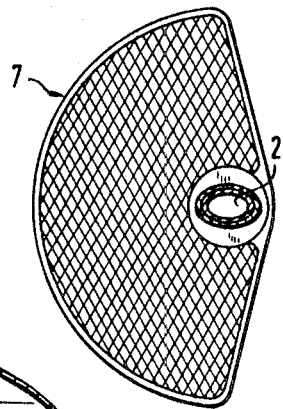
FIG. 3 is a plan view of a filter disc as shown in FIGS. 1 and 4.
Figure 2:
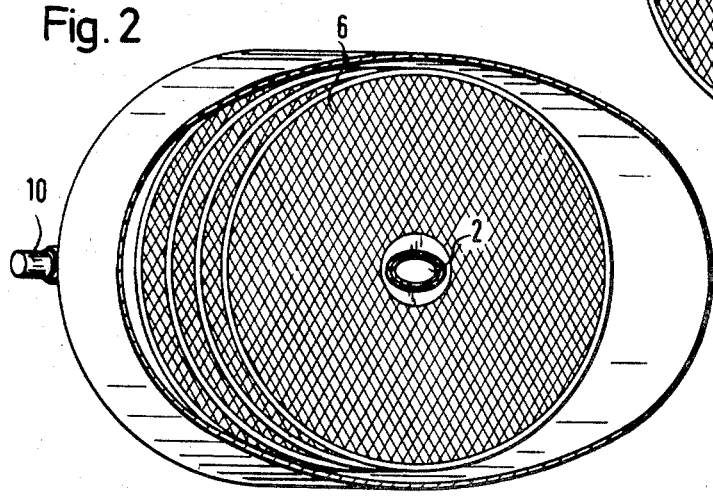
FIG. 2 is a section along the line II–II as denoted in FIG. 1.

Referring now more particularly to FIG. 1 it can be seen that reference numeral 3 denotes a lid and reference numeral 4 a bottom of a cylindrical filter container 1 whose axis in inclined from the vertical. Within the filer container 1 there is a hollow shaft 2, constituting a shaft and duct means, journaled in the lid 3 and the bottom 4. In the bottom part of the bottom 4 of the filter container 1 there is a sludge collecting space 5. FIlter discs 6, which are substantially circular and only permeable on their upper side, are mounted on the hollow shaft 2 with an angle of approximately 45° above one another, see FIG. 2. In order to enlarge the filtering surface one or more semicircular filtering discs 7 (see FIG. 3) are arranged for geometrical reasons at the ends of the hollow shaft 2. At the ends of the hollow shaft 2 within the cylindrical filtering container 1 struts or arms 9 are provided on which a helical part 8 is provided which extends along the inner peripheral surface of the filter container 1.

At the lower end of the filter housing 1 an electrical, hydraulic or pneumatic swiveling drive of conventional construction is provided with which the hollow shaft 2 can be oscillated. At the top end of the hollow shaft there is also a lever or arm 11 which on turning of the hollow shaft 2 through 180° abuts against a stop 12 and thus brings the angular movement of the shaft to an abrupt halt so that the shaft and the filter discs 6 and 7 are jerked. At the bottom end of the filter container 1 at a position adjacent to the collecting space 5 there is an inlet tube 14 for the liquid with the filtering aid suspended in it and, later, for the liquid to be filtered. By this tube also the pulp (dross), which remains after the filtration, can be drained from the container 1 before the filter discs 6 and 7 are swiveled into a vertical position. Close to the bottom end of the hollow shaft 2 there is an outlet tube 15 for the filtrate. This tube can also be used, if required, for the passage of a liquid or gaseous medium for detaching the filter cake from the discs. At the bottom of the collecting space 5 there is an outlet union 16 for the solid particles filtered out from the liquid. At the top of the filter container 1 there is an air discharge and air inlet valve 17 which can be operated manually or automatically in a conventional manner.

FIG. 4 shows a similar embodiment of the invention in which the sludge collecting space 5 is substantially greater than in FIG. 1 so that a sludge guide trough 5a with a greater pitch is provided (see FIG. 5). Furthermore, a swilling device 13 is provided at a position adjacent to the trough 5a with which, if required, the part of the interior of the container which has become coated with sludge on the cleaning of the filter discs 6 and 7 can be swilled. The other elements of the embodiment shown in FIG. 4 substantially correspond to the parts of the embodiment shown in FIG. 1 so that there is no need to describe it in more detail.

The manner of operation of a disc-type filter in accordance with the invention, for example using a filter aid, is as follows: the hollow shaft 2 is brought into such a position that the filter discs 6 and 7 mounted on it are in a horizontal position as shown, for example, in FIG. 1. Through the inlet tube 14 the suspension of filter aid is pumped into the filter container 1, the valve 17 serving for the escape of air remaining open until the filter container 1 is filled with liquid. Following this the liquid with the filter aid suspended in it is caused to flow through the hollow shaft 2 and the tube or pipe 15 out of the container, the filtering material being deposited on the upper faces of the filter discs 6 and 7. As soon as a sufficiently thick layer of filter aid has been deposited on the filter discs 6 and 7 the remaining filter aid suspension in the filter housing 1 is drained off through the tube. For this the valve 17 is opened again so that there is no subatmospheric pressure in the filter container 1, which would lead to the sucking in of air through the connection 15 and the hollow shaft 2 into the filter discs 6 and 7. Although the incoming air cannot dislodge the filter aid layer from the filter discs 6 and 7, cracks in the filter aid layer would be made so that beginning, the filtrate would be cloudy.

After the draining off of the residual suspension of filter aid, the filter container 1 is charged with the suspension to be filtered through the tube 14, the valve 17 at first remaining open during the filling. The valve 17 is then closed when the filter housing 1 is filled with suspension to be filtered. The filtrate now flows through the tube 15 out of the apparatus, while the solids of the suspension are retained on the filter discs 6 and 7. As soon as the sludge capacity of the filter discs 6 and 7 is exhausted, the supply of suspension is shut off and the suspension remaining in the filter container 1 is drained off through the connection 14 back into the suspension storage container (not shown). For this purpose the valve 17 can remain closed so that air suck through the tube 15 begins to dislodge or loosen the filter cake on the filter discs 6 and 7. As soon as the residual suspension has been drained off from the filter container 1, the swiveling drive 10 is set in motion and the hollow shaft turned through 180°. As a result the filter discs 6 and 7 come into a vertical position so that the filter cake falls under its own weight from the filter discs 6 and 7. Swiveling movement of the shaft 2 is halted by the arm 11 striking against the stop 12 so that there is a jerk and the filter discs are jolted with the result that residual cake residues are detached from the discs 6 and 7.

In practice there are naturally different requirements as regards the further processing of the sludge or cake extracted. If the filter cake obtained is to be as dry as possible air or another suitable gas can be passed into the filter housing 1 through the valve 17 after the suspension has been fully drained off from the container, so that the gas flows through the filter cake and dries it. When the gas supply is cut off, the dried filter cake can be easily removed from the filter discs 6 and 7 in the vertical position. Since the cake does not readily slide down into the sludge collecting space 5 to the outlet union 16, it must in some cases be propelled with the help of the helical part 8 shown in FIG. 1. In this case the arm 11 or the stop 12 must be removed so that one or more rotations of the hollow shaft 2 can be carried out so as to cause the coils of the helical part to move through one pitch and propel the filter cake from the filter discs 6 and 7 downwards.

In other cases it may, however, be convenient only to drain off a part of the residual suspension to be filtered, the filter cake then being dislodged from the discs and being discharged with the remaining suspension from the housing or container 1.

After the emptying of the container 1 the hollow shaft 2 is swung back into its initial position with the filter discs 6 and 7 lying horizontally so that a renewed filtering operation can be carried out, possible proceeded by the deposit of filter aid on the discs.

I claim:

1. A filter assembly comprising a container, a shaft and liquid duct means extending into said container, said shaft and duct means being rotatable relative to said container, a plurality of hollow filter disc means mounted on said shaft and duct means so as to be rotatable therewith and hydraulically connected thereto for drawing and conveying of liquid into said disc means, said disc means being mounted obliquely on said shaft and duct means, and said shaft and duct means being positioned at an angle inclined from the vertical, whereby during the filtration position of said filter assembly, said plurality of disc means are arranged substantially vertically one above the other and each of said disc means extends in a generally horizontal plane.

2. A filter assembly as claimed in claim 1, in which said filter disc means are each mounted on said shaft and duct means at an angle in the range of 30° to 60° relative thereto, and said shaft and duct means is inclined from the vertical at an angle in the range of 30° to 60°.

3. A filter assembly as claimed in claim 2, in which said filter disc means are each mounted on said shaft and duct means at an angle of 45° relative thereto, and said shaft and duct means is inclined from the vertical at an angle of 45°.

4. A filter assembly as claimed in claim 1, wherein the filter container is inclined from the vertical in a degree corresponding to the degree of inclination of said shaft and duct means.

5. A filter assembly as claimed in claim 1, comprising an extending arm mounted on said shaft and duct means, and stop means mounted on said filter container, said arm being adapted to abut against said stop means so as to limit rotative movement of said shaft and duct means.

6. A filter assembly as claimed in claim 1, wherein said filter disc means comprise one or more semicircular discs adjacent the end portions of said shaft and duct means, and the disc means positioned intermediate thereto being of generally circular configuration.